(12) United States Patent
Ulrich et al.

(10) Patent No.: US 6,738,189 B1
(45) Date of Patent: May 18, 2004

(54) MICROSCOPE FOR MEASURING AN OBJECT FROM A PLURALITY OF ANGULAR POSITIONS

(75) Inventors: Heinrich Ulrich, Heidelberg (DE); Johann Engelhardt, Bad Schoenborn (DE)

(73) Assignee: Leica Microsystems Heidelberg GmbH, Heidelberg (DE)

( * ) Notice: Subject to any disclaimer, the term of this patent is extended or adjusted under 35 U.S.C. 154(b) by 0 days.

(21) Appl. No.: 09/331,189

(22) PCT Filed: Dec. 23, 1997

(86) PCT No.: PCT/DE97/03015

§ 371 (c)(1),
(2), (4) Date: Nov. 30, 1999

(87) PCT Pub. No.: WO98/28647

PCT Pub. Date: Jul. 2, 1998

(30) Foreign Application Priority Data

Dec. 24, 1996 (DE) .......................... 196 54 208

(51) Int. Cl.⁷ .................. G02B 21/00; G02B 21/06
(52) U.S. Cl. .................. 359/368; 359/384; 359/388
(58) Field of Search .................. 359/368–390, 359/209–213, 831–837, 363, 431, 223, 370, 385, 389, 386–388, 233; 250/234, 235, 236

(56) References Cited

U.S. PATENT DOCUMENTS

| | | | | |
|---|---|---|---|---|
| 4,181,436 A | | 1/1980 | Wasmund et al. .......... 359/225 |
| 4,650,335 A | * | 3/1987 | Ito et al. ...................... 356/398 |
| 4,734,578 A | * | 3/1988 | Horikawa et al. .......... 250/234 |
| 4,832,474 A | * | 5/1989 | Yoshinaga et al. .......... 359/385 |
| 4,856,891 A | * | 8/1989 | Pflibsen et al. ............. 351/210 |
| 5,052,789 A | | 10/1991 | Kleinberg ................... 359/375 |
| 5,270,855 A | * | 12/1993 | Hasegawa ................... 359/383 |
| 5,365,288 A | * | 11/1994 | Dewald et al. ............. 359/223 |
| 5,532,873 A | * | 7/1996 | Dixon ........................ 359/388 |
| 5,561,554 A | * | 10/1996 | White et al. ................ 359/368 |
| 5,682,245 A | | 10/1997 | Kudo et al. ................. 356/444 |
| 5,701,197 A | * | 12/1997 | Yano ........................ 359/368 |
| 5,760,951 A | * | 6/1998 | Dixon et al. ................ 359/368 |
| 5,896,224 A | * | 4/1999 | Kapitza ...................... 359/368 |
| 6,055,097 A | * | 4/2000 | Lanni et al. ................ 359/368 |
| 6,072,625 A | * | 6/2000 | Kitahara et al. ............ 359/388 |
| 6,433,814 B1 | * | 8/2002 | Engelhardt et al. ........... 348/79 |
| 6,580,554 B2 | * | 6/2003 | Engelhardt et al. ......... 359/368 |

FOREIGN PATENT DOCUMENTS

| | | | |
|---|---|---|---|
| EP | 0 464 236 | 1/1992 | |
| JP | 8-248324 | 9/1996 | |
| JP | 8-334698 | * 12/1996 | ................ 359/368 |
| JP | 10-48527 | * 2/1998 | ................ 359/368 |
| WO | WO 94/08425 | 4/1994 | |

* cited by examiner

Primary Examiner—Thong Q. Nguyen
(74) Attorney, Agent, or Firm—Foley & Lardner LLP

(57) ABSTRACT

The invention relates to a microscope, in particular a confocal microscope, designed to measure an object from several angular positions while avoiding any rotation of the object to be measured. The microscope has an optical device for rotation of the image to be positioned in the ray path of the microscope.

12 Claims, 3 Drawing Sheets

MICROSCOPE FOR MEASURING AN OBJECT FROM A PLURALITY OF ANGULAR POSITIONS

BACKGROUND OF THE INVENTION

The invention relates to a microscope, in particular a confocal microscope or confocal laser scanning microscope.

Conventional microscopes, and indeed confocal microscopes or confocal laser scanning microscopes as well, have been disclosed for years in the art, so it is not necessary to provide a specific description of these microscopes here. In the confocal-laser scanning microscope, the beam scanning direction provides a preferred direction for the measurement or scanning. Since complicated structures—such as modern semiconductor designs—increasingly do not have rectangular structures, however, their measurement—in industry—necessitates rotating these structures or the object which is configured in such a way relative to the scanning beam.

Furthermore, for measurement purposes it may be necessary, in principle, to perform rotation of the object in order, for example, to be able to compare any desired structural features with predetermined structural patterns in the context of quantitative structural analysis. At any rate, in a wide variety of fields of application there is a fundamental requirement of being able to rotate the image as desired, for which purpose it has been necessary to rotate the object heretofore.

When the object is rotated about an arbitrary point, the object has to be rotated, on the one hand, and displaced, on the other hand, in such a way that this arbitrary point lies at the pivot point of the object, namely in order to obtain the center point of the image. However, the rotation and, if appropriate, simultaneous displacement of the object leads to a complex movement entailing a considerable outlay on setting.

As seen per se, an apparatus and a method for projecting images for use in television or video technology are disclosed in WO-A1-94/08425, according to which, during image projections, rotations are performed for the purpose of compensating for horizontal movements.

SUMMARY OF THE INVENTION

The present invention is based on the object, therefore, of configuring and developing a microscope, in particular a confocal microscope or confocal laser scanning microscope, in such a way that an object can be measured from a plurality of angular positions whilst avoiding rotation of the object to be measured.

The invention, microscope or confocal microscope or confocal laser scanning microscope achieves the above object by means of the features described herein, according to which the invention's microscope, confocal microscope or confocal laser scanning microscope is characterized by an optical arrangement for image rotation, said optical arrangement being provided in the beam path of the microscope.

The invention marks a departure, in the case of microscopes of the type discussed here, from rotating the object itself, or simultaneously displacing it in the process, in order to measure the object at different beam angles. Rather, optical rotation is now performed, namely by means of an optical arrangement for image rotation, said optical arrangement being provided in the beam path of the microscope, with the result that the object itself remains positioned in an unchanged manner. Consequently, repeated setting or calibration of the object is no longer necessary.

The optical arrangement for image rotation may be, for example, a prism designed in a wide variety of ways; thus, by way of example, a Dove prism or an Abbe prism. Further suitable prisms can be used for this purpose, it being essential that the prism is used as a quasi monolithic module for image rotation.

In the context of an alternative configuration of the optical arrangement for image rotation, the latter could be a mirror arrangement, preferably an arrangement with an odd number of mirrors, as is the case with the "K" mirror. More complicated configurations are conceivable here, it being necessary to take account of the fact that the light losses increase as the number of mirrors increases. In this respect, an arrangement with three mirrors presents itself as an advantageous configuration.

With regard to concrete localization of the arrangement for image rotation, it is advantageous in the context of an especially simple configuration if said optical arrangement is arranged in the parallel beam path of the microscope. Specifically, the optical arrangement for image rotation could be arranged between the tube lens and the objective, namely in the infinite beam path of the microscope.

Likewise, it would alternatively be conceivable for the optical arrangement for image rotation to be arranged downstream of the eyepiece and/or the tube lens, this resulting in inconsiderable requirements of the angular accuracy of the arrangement. In the context of such a configuration, the arrangement for image rotation would easily be able to be retrofitted. The requirement of synchronous rotation of the two eyepieces would certainly be disadvantageous in this case.

In the context of a further configuration option, the optical arrangement for image rotation could serve for rotating all the scanned and video images fed into the microscope by a laser scanner. To that end, the optical arrangement for image rotation could be arranged between a scanning lens and a scanning mirror of the laser scanner. This configuration is advantageous in so far as here there is a substantially smaller degree of angular sensitivity, as exists when the rotor is arranged between tube lens and objective.

In order to avoid interference when coherent light sources are used, the laser scanner could have stationary beam splitters which are sufficiently thick or sufficiently wedge-shaped, with the result that the internal reflections of the original beams run in a manner spatially separated from the original beams. Interference phenomena are thereby suppressed.

Furthermore, a separate adjustment apparatus could be provided for the purpose of minimizing the beam offset during rotation of the arrangement.

Finally, in a further advantageous manner, provision is made of an axially moveable objective and/or an axially moveable objective turret for taking z-sections in arbitrarily oriented directions.

BRIEF DESCRIPTION OF THE DRAWINGS

There are, then, a variety of possibilities for configuring and developing the teaching of the present invention in an advantageous manner. To that end, reference is made to the following exemplary embodiments of the invention with reference to the drawing. In conjunction with the explanation of the preferred exemplary embodiment of the invention, in general preferred configurations and developments of the teaching will also be explained. In the drawing.

DETAILED DESCRIPTION OF THE PREFERRED EMBODIMENTS

Figure 1:
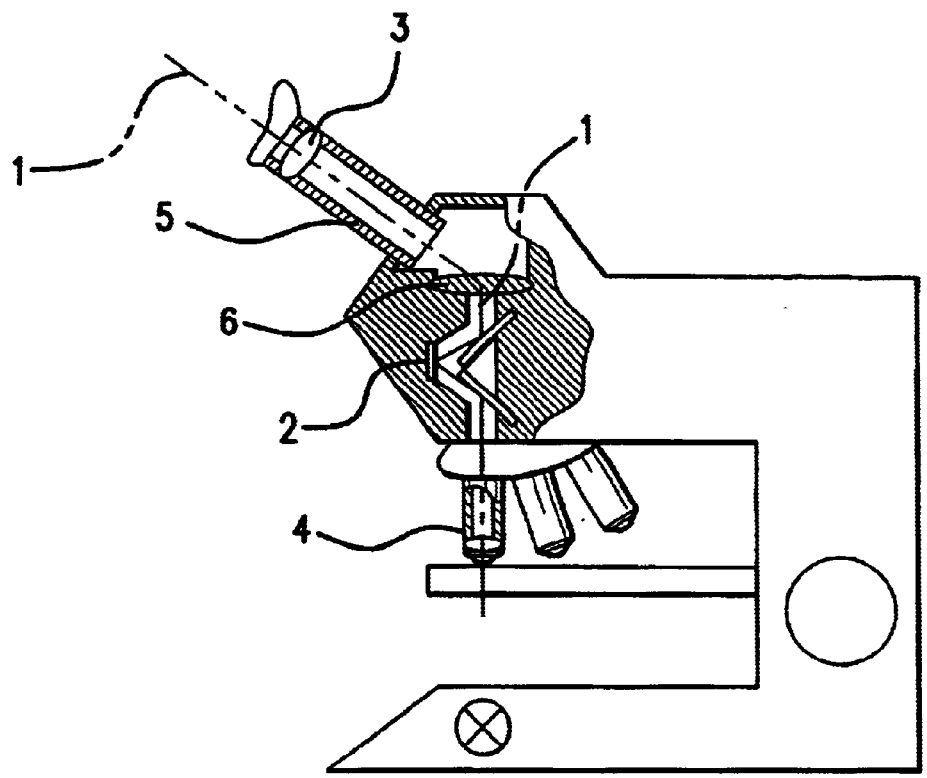
FIG. 1 shows, in a schematic side view, a first exemplary embodiment of a microscope according to the invention with an optical arrangement for image rotation.

FIG. 1 shows a first exemplary embodiment of a microscope according to the invention with an arrangement 2 for image rotation which is provided in the beam path 1 of the microscope.

In the case of the exemplary embodiments which are illustrated in the figures, the arrangement 2 for image rotation is—for the sake of a simple illustration—a "K" mirror arranged at different locations in the beam path 1 of the microscope.

In the case of the illustration shown in FIG. 1, the arrangement 2 is arranged between the tube lens 6 and the objective 4, which will certainly give rise to a problem in terms of retrofitting capability.

Figure 2:
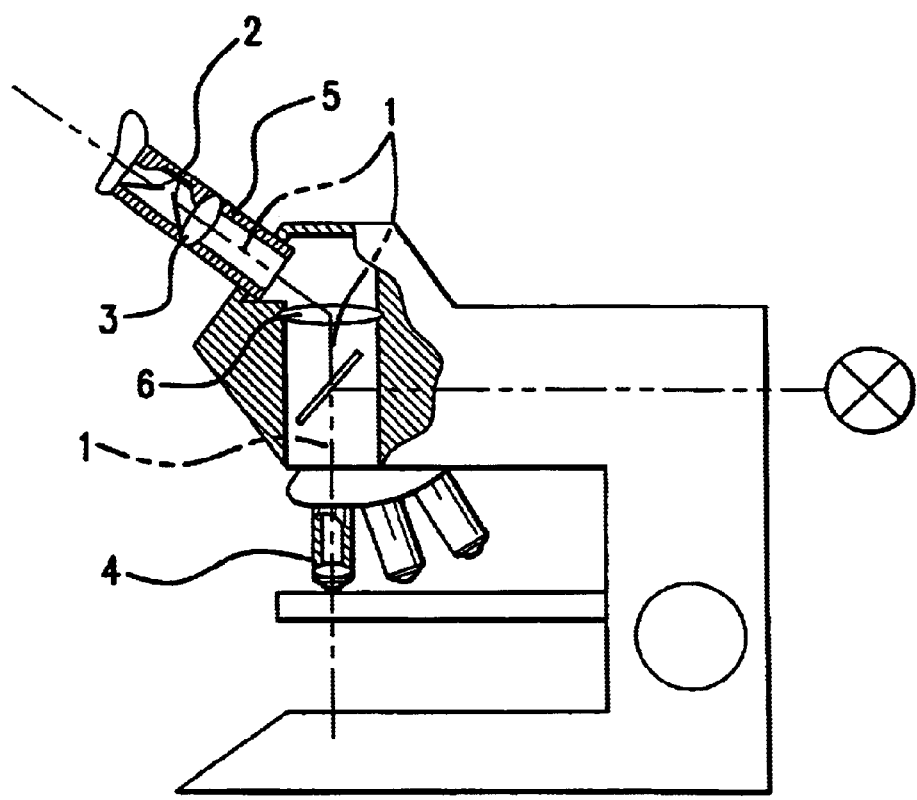
FIG. 2 shows, in a schematic side view, a second exemplary embodiment of a microscope according to the invention with an optical arrangement for image rotation.

In accordance with the illustration in FIG. 2, the arrangement 2 for image rotation is arranged down-stream of the eyepiece 3 and the tube lens 6. In this respect, the resulting requirements of the angular accuracy of the arrangement in FIG. 1 are substantially less stringent. Moreover, this arrangement can easily be retrofitted, the requisite synchronous rotation for the two eyepieces 3 being problematic or disadvantageous in terms of the handling of the microscope.

Figure 3:
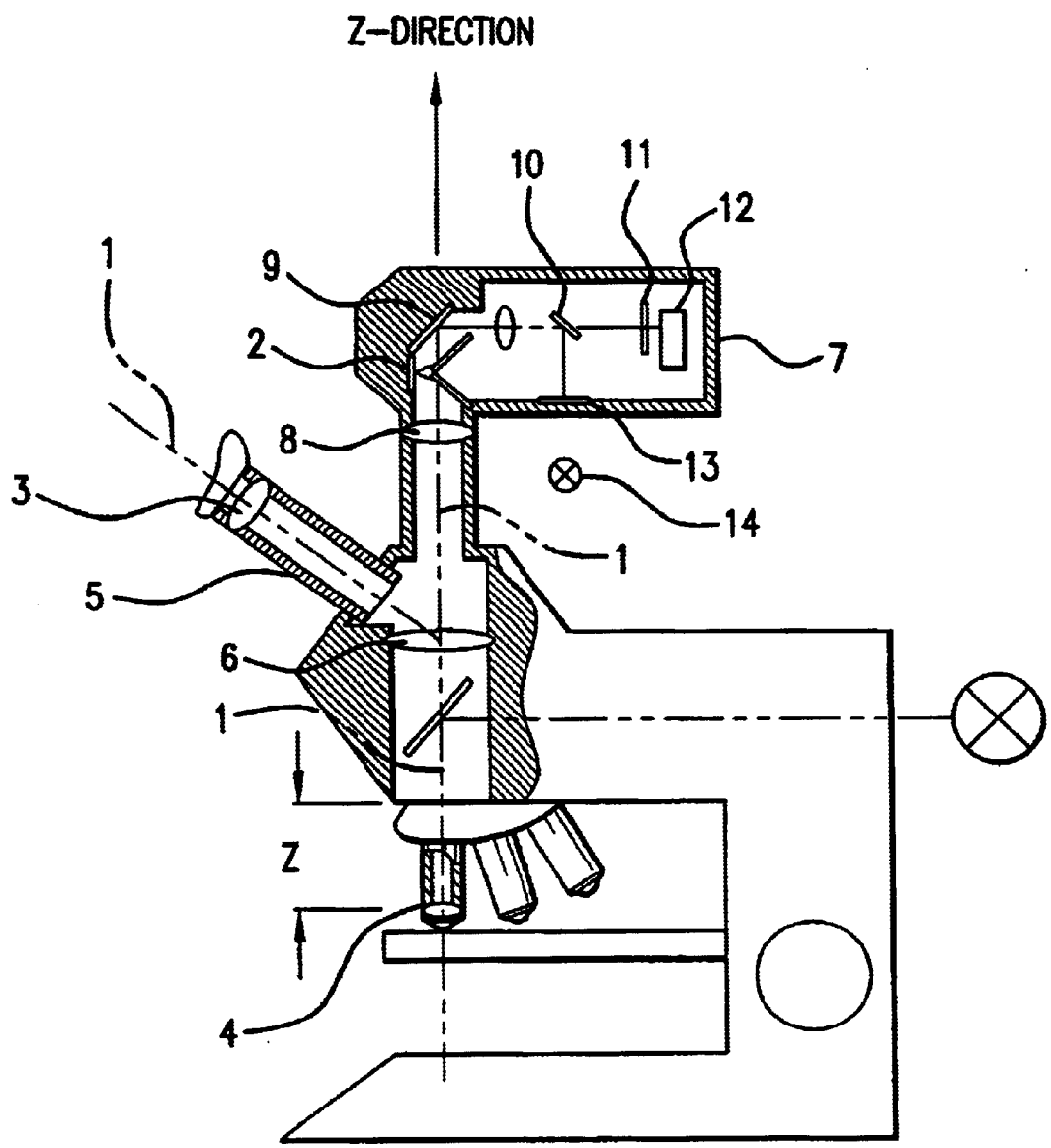
FIG. 3 shows, in a schematic side view, a third exemplary embodiment of a microscope according to the invention with an optical arrangement for image rotation.

In the case of the microscope illustrated in FIG. 3, the optical arrangement 2 for image rotation serves for rotating all the scanned and video images fed into the microscope by a laser scanner 7. Specifically, the optical arrangement 2 for image rotation is arranged between a scanning lens 8 and a scanning mirror 9 of the laser scanner 7.

Figure 4:
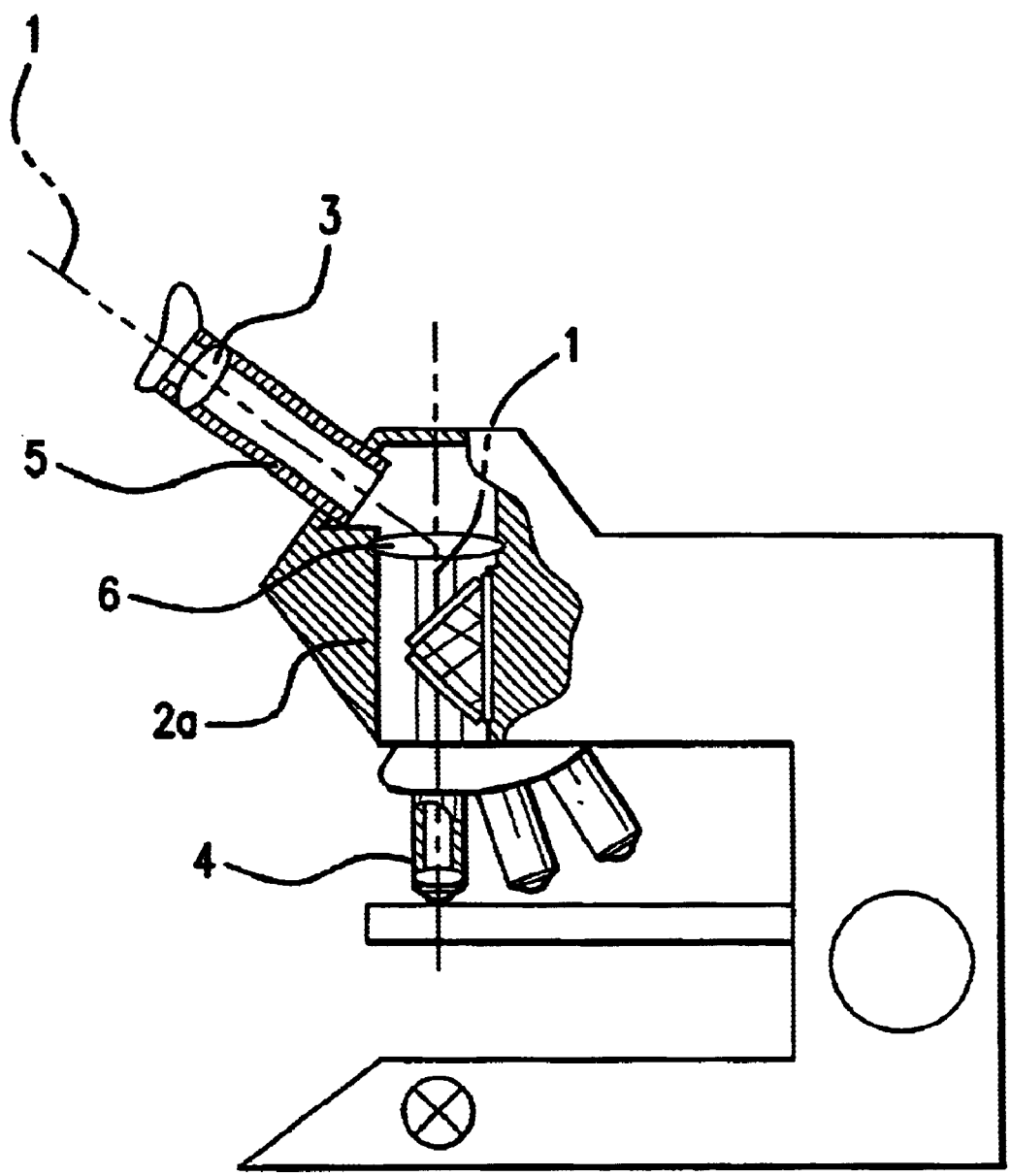
FIG. 4 shows a schematic side view of a fourth embodiment of a microscope according to the invention wherein the optical arrangement is a prism.

A fourth embodiment is shown in FIG. 4. The optical arrangement 2 for image rotation is configured as a prism 2*a*. The prism 2*a* is arranged in this embodiment between the tube lens 6 and the objective 4. Other arrangements of the prism are possible as well (see e.g., the microscope embodiments shown in FIG. 2 and FIG. 3).

With regard to further embodiments on the one hand of a concrete configuration of the arrangement 2 for image rotation and on the other hand with regard to further measures relating to adjustment for the purpose of minimizing the beam offset or relating to axial mobility of the objective and/or of the objective turret, reference is made to the general part of the description in order to avoid repetition.

In conclusion, it shall be especially emphasized that the exemplary embodiments discussed above serve to provide an understanding of the teaching that is claimed here, but do not restrict said teaching to the exemplary embodiments.

List of Reference Symbols

1 Beam path
2 Arrangement for image rotation ("K" mirror)
3 Eyepiece
4 Objective
5 Eyepiece housing
6 Tube lens
7 Laser scanner:
   10 Beam splitter
   11 Detection pinhole
   12 Detector
   13 Excitation pinhole
   14 Light source
8 Scanning lens (of the laser scanner)
9 Scanning mirror (of the laser scanner)

What is claimed is:

1. A confocal microscope comprising:
   optics defining a path of rays of a confocal microscope;
   an ocular;
   a tube lens; and
   a rotatable optical system for image rotation disposed in the path of rays of the confocal microscope, wherein the rotatable optical system is disposed between a scanning lens and a scanning mirror of a laser scanner in the path of rays of the confocal microscope,
   wherein the scanning mirror directs a rotated image to a detector.

2. Confocal microscope according to claim 1, wherein the rotatable optical system for image rotation is a prism.

3. Confocal microscope according to claim 2, wherein the prism is a dove prism.

4. Confocal microscope according to claim 2, wherein the prism is an Abbe prism.

5. Confocal microscope according to claim 1, wherein the rotatable optical system for image rotation is a mirror system.

6. Confocal microscope according to claim 5, wherein the mirror system is a system with an odd number of mirrors.

7. Confocal microscope according to claim 5, wherein the mirror system is configured as a K mirror.

8. Confocal microscope according to claim 1, wherein the laser scanner further comprises a fixed thick beam splitter to avoid interferences.

9. Confocal microscope according to claim 1, further comprising an axially movable objective.

10. Confocal microscope according to claim 1, further comprising an axially movable objective turret.

11. The confocal microscope according to claim 1, wherein the rotatable optical system for image rotation serves to rotate all scanning and video images fed to the laser scanner from the microscope.

12. A confocal microscope comprising:
    an ocular;
    a tube lens;
    a rotatable optical system for image rotation disposed in the path of rays of the confocal microscope, wherein the rotatable optical system is disposed between a scanning lens and a scanning mirror of a laser scanner in the path of rays of the confocal microscope, wherein the rotatable optical system for image rotation serves to rotate all scanning and video images fed to the laser scanner from the microscope,
    an excitation pinhole disposed in a path of excitation light; and
    a detection pinhole disposed proximate to a detector.

* * * * *